Figure 1:
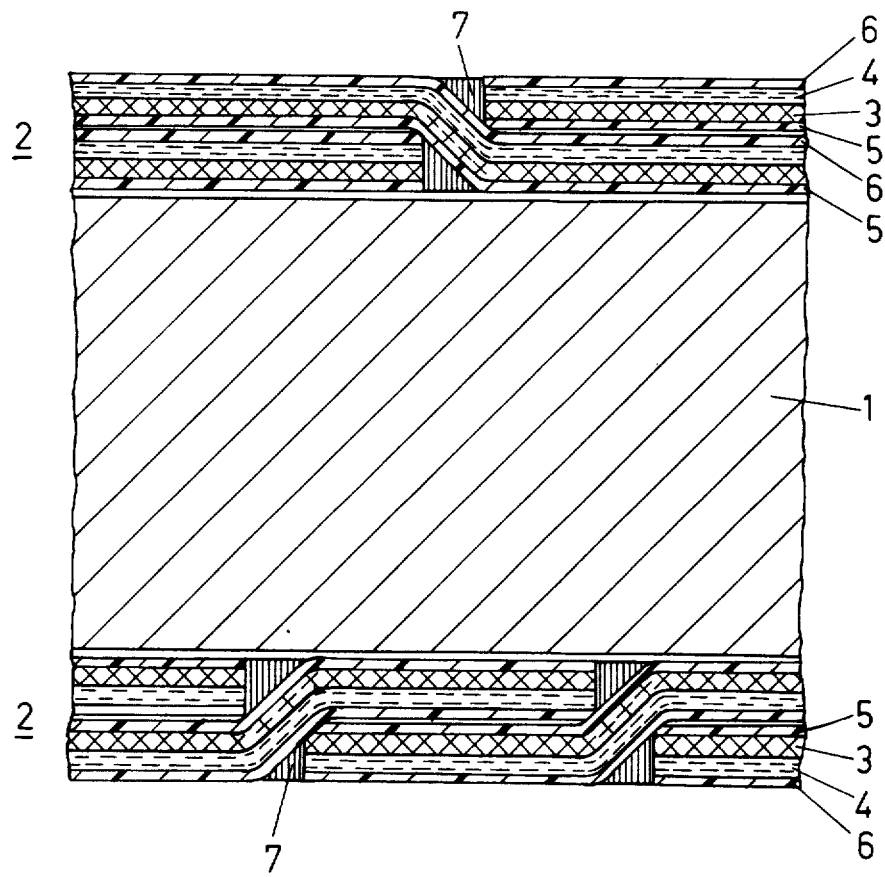

United States Patent [19]

Schuler

[11] 4,038,741
[45] Aug. 2, 1977

[54] METHOD OF MAKING ELECTRICAL COILS FOR DYNAMO-ELECTRIC MACHINES HAVING BAND-FORMED INSULATION MATERIAL

[75] Inventor: Roland Schuler, Wettingen, Switzerland

[73] Assignee: BBC Brown Boveri & Company Limited, Baden, Switzerland

[21] Appl. No.: 648,801

[22] Filed: Jan. 13, 1976

Related U.S. Application Data

[62] Division of Ser. No. 467,836, May 7, 1974, abandoned.

[30] Foreign Application Priority Data

May 17, 1973 Switzerland .............................. 6962

[51] Int. Cl.² .................... H02K 15/04; H01F 41/12
[52] U.S. Cl. .................................... 29/596; 29/605; 174/120 SR; 174/121 SR; 310/208; 310/213
[58] Field of Search ............... 29/596, 605; 310/208, 310/213; 174/120 SR, 121 SR; 156/53

[56] References Cited

U.S. PATENT DOCUMENTS

| | | | |
|---|---|---|---|
| 2,656,290 | 10/1953 | Berberich et al. | 29/596 X |
| 2,707,204 | 4/1955 | Richardson et al. | 29/596 X |
| 2,917,570 | 12/1959 | Wolff et al. | 174/120 SR |
| 3,556,925 | 1/1971 | Mertens | 29/596 X |
| 3,695,984 | 10/1972 | Rogers, Jr. | 174/120 SR X |

*Primary Examiner*—Carl E. Hall
*Attorney, Agent, or Firm*—Pierce, Scheffler & Parker

[57] ABSTRACT

A composite tape insulation for use in winding onto electrical conductors to be further processed for installation in an electrical machine comprises an internal insulation structure having a layer of glass cloth or polyester fleece and a layer of fine mica impregnated with a cured synthetic resin such as an epoxide resin, and outer facing layers of a synthetic material such as a polycarbonate resin bonded to opposite sides of the internal insulation structure by the impregnating resin. The composite tape insulation is made by passing the internal layer structure through a bath of the impregnating resin, thereafter applying the outer facing layers, heating the resulting composite structure so as to cure the impregnating resin to an intermediate B state, winding the composite structure onto the bare electrical conductor with an overlap of the order of 50%, cutting the conductor into lengths which are then shaped to the desired configuration, and then final pressing and heating the insulated and shaped conductor lengths to establish a final bond of all components and conversion of the impregnating resin to its C state.

6 Claims, 2 Drawing Figures

4,038,741

METHOD OF MAKING ELECTRICAL COILS FOR DYNAMO-ELECTRIC MACHINES HAVING BAND-FORMED INSULATION MATERIAL

This a division of application Ser.No. 467,836 filed May 7, 1974 now abandoned.

The present invention relates to an improved construction for a composite resin-impregnated insulation material that is designed especially for the purpose of insulating coil-forming conductors of a dynamo-electric machine, and also to a novel method by which the composite insulation material, in tape form for winding onto the conductor, is made.

Electrical motors having a high output and synchronous electrical generators of medium output are constructed, almost exclusively, for reasons based upon production and design, with so-called "whole-body" - Ganzform -coils. The coils consist of several turns which are connected in series and which therefore require insulation first from each other, so-called turn insulation, and secondly they must be insulated from the laminated magnetic iron body of the machine into which they are inserted, the latter insulation being referred to as the "main" insulation. The following significant insulation techniques are usually employed for this purpose.

1. Strips of insulating material are placed between the otherwise bare conductors which form the coil turns.
2. Whole-body coils are produced from individual conductors having a coating of insulating enamel applied thereto.
3. Individual, enameled conductors are provided additionally with an insulating covering, usually glass fibers or the like.
4. The bare, individual conductors are wrapped by hand with a suitable insulating tape after formation of the conductors into coils.

The individual coils formed from the conductors which have thus been pre-insulated are finally wrapped with the main insulation prior to installation in the machine component. Application of the final, main coil insulation can be carried out according to the method disclosed in Publication No. 3889D of BBC Brown, Boveri & Cie AG, Baden, Switzerland, in an article entitled "Micadur-Compact- Kunstharz-Isolierung fur mittlere Hochspannungsmaschine."

Insulation which is produced according to the complete-impregnation method possesses electrical, thermal and mechanical properties of such superior quality that it is now feasible to build large-size electric motors and synchronous generators of medium output which have proven reliable in service even for higher voltages. Therefore, machines of this type are currently and in increased numbers being connected to medium-voltage power supply networks without the need for interposing costly transformer equipment. In this case, better and more costly insulation is required since the machines are now subjected not only to the higher rated voltages, up to 20 KV, but also to faults of various types and excess voltages which may occur in medium voltage power supply networks. In addition to a strengthening of the main insulation applied to the complete coils, there is also a need to improve the insulation applied to the conductors which are made up into the coils, the so-called turn insulation. In view of the insulating materials known at the present time, this can be accomplished in practice by winding mica-containing insulating tape around the individual bare conductors. However, these mica-containing tapes are somewhat fragile and cannot withstand the severe mechanical stresses imposed upon them during formation of the thus insulated conductors into coils. It is for this reason that the turn insulation is applied only after the bare conductors are deformed into a whole-body coil, an operation which is very time-consuming, as well as difficult, because the insulating tape must be threaded between and pulled through the individual conductor turns by hand only, since it has not been found possible to utilize winding machines for this purpose.

Similar problems arise when the conductor turn insulation is to be provided on the conductor components of large high voltage machines which comprise several rod-type conductors that undergo transposition in making up the coil, so-called "Roebel" conductors. Again, there might be a necessity to utilize insulations which are more resistant to stresses than the enamel which has been heretofore used to insulate the various conductor elements from each other since, for example, these machines will now be subjected to higher voltages.

The principal objective of the present invention is therefore to provide an improved insulation in tape form for use in insulating individual conductor elements which are thereafter made up into coil form, after which the main insulation is applied to the coil as a whole prior to insertion in the machine component such as the stator element. A further objective is to provide a novel method by which the improved insulation is made.

The improved tape insulation enables one to overcome the disadvantages of the previously known structures and is distinguished by its high mechanical, thermal and electrical ratings. Moreover, it can be manufactured in a novel and simple manner.

The tape insulation in accordance with the invention for providing turn insulation as between conductors and applied to individual bare conductor mateerial comprises at least a layer containing mica and both sides of the tape are faced with a foil of synthetic resin mateerial are adhered respectively thereto by means of a solvent-free bonding medium.

In this manner it becomes possible, so far as is known, for the first time to provide the bare, and not yet coil-formed, conductor in one continuous operation with a wrapped-around insulating cover to provide individual conductor insulation, and then to work up the insulated conductor by forming it into a whole-body coil, or into some other shape, e.g. the conductor elements of a Roebel type conductor. The improved insulating tape proposed by the invention will protect the delicate and fragile insulation material, especially the very delicate layer of fine mica, thus making feasible, due to the facing on both sides of the tape with a smooth foil of synthetic material, a flake-like superposition of adjacent, overlapping layers of the insulating tape during the forming, i.e. bending operation performed on the conductor. A foil of synthetic resin material could introduce an adverse effect during operation of the machine because such material is normally not glow-resistant. However, by utilizing foil which is extremely thin, in the range of from 5 to 15 μm, and adhering it to the interior layer or layers of the insulating tape by the binding, i.e. impregnating medium, preferably a curable synthetic resin, applied to the tape in its A state before the synthetic resin foils are applied, the latter will not adversely affect the glow-resistance character of the insulaton as a whole.

It has been found to be particularly advantageous to utilize polycarbonate resin as the material for the facing foils and having a thickness in the range of from 8 to 10 μm, which are smooth i.e. they have not been roughened mechanically or chemically. Such foils are commerically available, for example, from the firm of BAYER at Leverkussen under the tradename MAKROFOL.

The mica-containing insulating material can be composed of two initially separate layers which are brought together and laminated with the outer facing foils of synthetic resin by means of a curable impregnating synthetic resin. Thus, one layer of the composite insulation can consist of a polyester fleece or glass cloth and another layer can provide the desired fine mica. If network voltages rated up to 20 kV are involved, the layer of fine mica should have a thickness in the range between 50 and 150 μm, and the other layer, of polyester fleece of glass cloth a thickness between 20 and 40 μm.

As will be explained hereinafter in further detail the foils of synthetic material are adhered to the inner insulation layers of the tape by means of a solvent-free bonding medium, e.g. an epoxide resin in the B state. This bonding medium when in its applied A state also serves simultaneously to impregnate and hold together the inner layer of fine mica and polyester fleece or glass cloth. Its resin portion should range between 25 and 35% of the total weight of the tape.

The essentials of insulating the conductor material consists in enveloping a straight, bare conductor with an insulating material which is applied in an at least partially overlapping manner, is impregnatable and contains mica, and is faced on both sides with a foil of synthetic resin which is adhered in place by use of a solvent-free synthetic resin bonding medium which is used as an impregnant. The conductor, preinsulated in this manner, is then worked to the desired configuration dictated by the configuration of the coil to be produced from it, and the various components of the composite tape are then finally all glued together by the use of heat and pressure at those areas of the coil which will lie within the machine component in which it is to be installed, e.g. in the slots of a laminated iron stator. The heat and pressure serve to cure and harden the impregnating resin.

This method makes possible an economic and simple manufacture of whole-body coils, or Roebel conductors because of the fact that the step of applying insulation in tape form to individual conductors which previously had to be performed by hand, can now be performed to a large extent by machine.

If the proportion of resin in the impregnating medium is kept within 25 to 35% of the total weight of the tape as specified above, a reliable impregnation and glueing together of the individual components of the composite insulating tape will be obtained. The compounding (Anlosung) of the foil will ensure its adhesion to the layers beneath it. Any excess impregnating resin can escape during the pressure and thermal treatment at the points of overlap, and will then serve to glue together individual conductors located side-by-side, and/or superposed.

It was found particularly advantageous to provide an overlap in the range between 40 and 60% and preferably about 50%. An overlap of this magnitude will ensure satisfactory insulation at sharply bent regions, e.g. within the coil heads, i.e. those end portions of the coil which extend beyond the ends of the slots in which they are installed. Obviously it is also possible to apply several layers of the insulation tape in succession, if necessary. Even in this case, the range of overlap specified above should be maintained.

Figure 2:
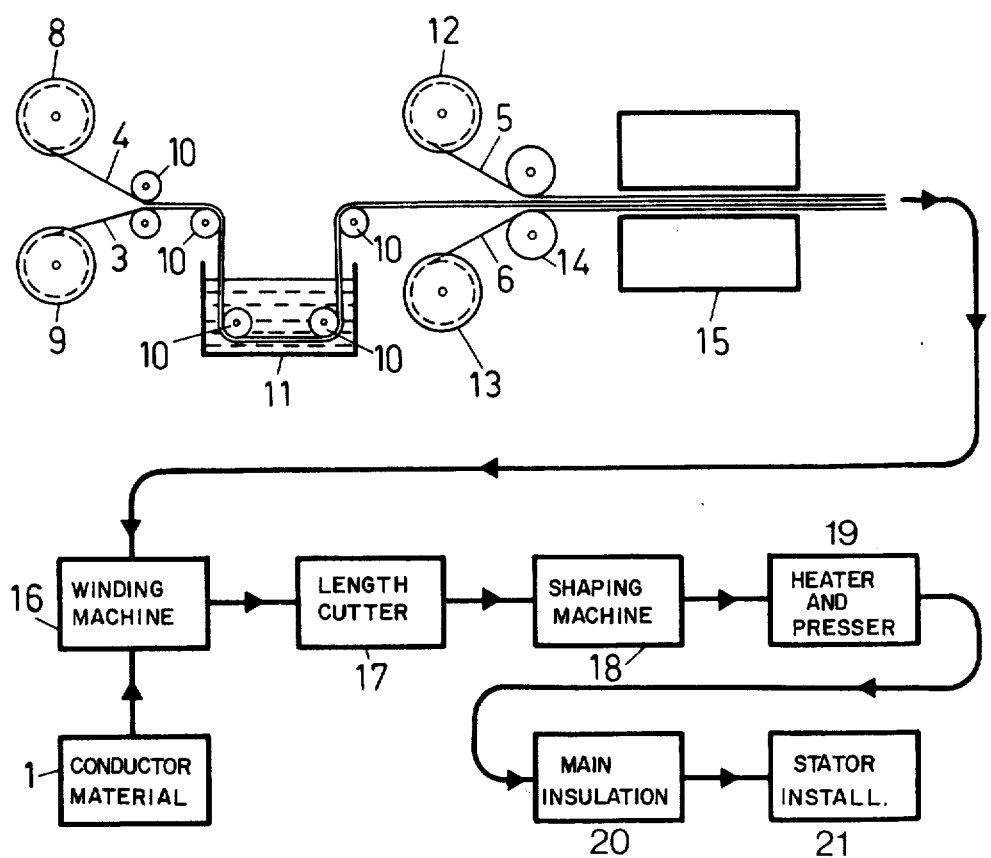

The invention is explained in further detail hereinafter and is illustrated in the accompanying drawings wherein:

FIG. 1 shows in a longitudinal cross-section a portion of an electrical conductor provided with the improved insulation; and FIG. 2 illustrates in a somewhat diagrammatic manner, one suitable apparatus by which the improved insulation is formed and applied to the conductor and which thereafter is further processed into coil form, finally insulated and installed in the machine.

With reference now to FIG. 1, a longitudinal section of bare electrical condutor 1 has applied to it a composite insulation tape 2 by winding on the tape with an overlap of approximately 50%. Two layers of the composite tape 2 are seen to be provided in a superposed manner on the surface of the conductor. The composite insulating tape 2 consists of a layer of polyester fleece or glass cloth 3, a layer 4 of fine mica in contact with layer 3 and foils 5 and 6 of synthetic material e.g. a polycarbonate resin, applied respectively to the insulation layers 3 and 4. The interspaces 7 which form due to the overlap, are filled with synthetic resin not seen in FIG. 1 which impregnates layers 3 and 4 and which in the course of manufacture of the composite tape 2 has emerged from its interior.

The thickness dimensions of the various insulation components 3 and 6 have been purposely exaggerated in order to more clearly illustrate the structure and arrangement of the various layers. In practice, however, the following materials and thicknesses are utilized for the various layers of the composite tape structure:

3 - glass cloth: GLASTEX Type 103 manufactured by the firm of Kagi, or Horgen, Switzerland, having a thickness of approximately 25 μm, and a weight of approximately 25 g/m².

4 - fine mica: SAMICA manufactured by the firm of ISOLA-Werke, Breitenbach, Switzerland having a thickness of approximately 100 μm.

5,6 - synthetic foil: Polycarbonate resin e.g. MARKROFOL having a thickness of 8.7 μm.

Impregnating epoxy resin: ARALDIT F with catalyzed hardener system, type $BF_3$ manufactured by CIBA, Basel, Switzerland.

The individual, pre-insulated conductor as illustrated in FIG. 1 is followed, depending upon the type of machine, by additional, identically insulated single conductors, not illustrated. They are glued together by the impregnating resin, emerging at the points of overlap during the subsequent heat and pressure treatment and the characteristics of the synthetic foils 5, 6 to be compounded play a particularly important role.

The improved method in accordance with the invention for manufacturing insulated conductors for use in forming coils that are inserted in a component of an electrical machine such as a stator can be broken down into the following processing steps.

1. Manufacture of the composite insulation tape 2.
2. Winding the bare conductor with the tape 2.
3. Deformation of the now insulated conductor to the desired configuration as dictated by the shape of the coil, and 4. Heat and pressure treatment.

With reference now to FIG. 2 which illustrates one suitable apparatus for carrying out the invention, it will be seen that from two supply rolls 9 and 8 tapes of glass cloth 3 and fine mica 4 are drawn and guided by way of rolls 10 into and through an impregnating vat 11 which is filled with the impregnating resin e.g. ARALDIT F, as mentioned, in its so-called A state, i.e. in a liquid state. After leaving the impregnating vat, the resin-impregnated glass cloth and fine mica tapes 3,4 pass between two further supply rolls 12 and 13 from which the synthetic foils 5,6 e.g. polycarbonate resin are drawn. These two foils, 5,6 along with the resin-impregnated contacting layers 3,4 therebetween are passed between two rolls 14 which serve to apply sufficient pressure to hold the composite structure temporarily together. The proportion of the impregnating resin introduced into the composite structure can be regulated by a corresponding variation in the contact pressure exerted by the rolls 14. The composite insulating tape structure is then passed through a heating device 15 which functions to dry the composite tape and convert the impregnating resin into its B state.

The second step in the method is that of winding the composite insulating tape 2 in the state in which it is discharged from heater 15 onto the bare conductor 1. This is accomplished on a conventional winding machine and therefore illustrated only by way of a block unit 16 in the flow diagram of FIG. 2. Winding machine 16 is then followed by a length-cutting machine, also of conventional design, and therefore likewise illustrated only schematically by means of block unit 17. This machine serves to cut the continuous, insulated conductor emerging from the winding machine 16 into desired lengths as determined by the required dimensions of the coils to be formed from them. The cut-lengths of insulated conductors taken from the machine 17 are then grouped and shaped into the form required for subsequent installation into the electrical machine, for example, whole-body coils or transposable conductor elements of a Roebel type composite conductor. Shaping takes place in another machine also of conventional design and the latter has therefore also been illustrated as a block unit 18.

Thermal and pressure treatment of the whole-body coils, or of the Roebel type conductor is accomplished in a heating and pressing device also of conventional design and illustrated only by block unit 19 and which latter has a working contour matching that of the conductor shape. The heating and pressing machine 19 serves to treat only those conductor portions of coils which are to be placed in slots of the machine component, e.g. a laminated iron stator. The conductor portions from which the coil heads are formed, i.e. the portions which overhang the ends of the slots are subjected to additional processing.

During this thermal and pressure treatment in the device 19, excess impregnating resin will emerge at the points of overlap and will serve to glue together the individual conductors from which the coil is formed and to fill the recesses and cavities generated by the overlapping winding. After final curing of the impregnating resin which takes place in the device 19, the resin thus reaches its C-state and attains its final mechanical and electrical properties.

After leaving the heating and pressing device 19, the conductors can now have their main insulation applied thereto by hand or preferably by a conventional machine and therefore illustrated only by a block unit 20 and are now ready for their intended use, i.e. installation in the electrical machine indicated functionally by block unit 21. Application of the main insulation to the conductors by way of a machine is now practical since only comparatively uncomplicated conductor shapes, whole-body coils and the like, are being processed.

Those operations which follow the heating and pressing stage in block unit 19 are not considered to be part of the inventive concept of the present application and moreover are described in detail in the above-mentioned Brown Boveri Publication "Micadur Compact. . . . ".

I claim:

1. The method of producing an electrical coil for installation in an electrical machine and wherein each turn of the coil is formed by a group of pre-insulated conductors which comprises the steps of:

winding a composite insulating tape onto a bare conductor so as to completely cover the surface of the conductor, said composite tape including an inner layer of insulating material containing mica and facing layers of a polycarbonate foil secured to opposite sides thereof by an epoxy resin which impregnates the inner layer.

shaping and grouping conductors so pre-insulated into the form required for subsequent installation in the electrical machine, and subjecting the grouped and shaped pre-insulated conductors to heat and pressure thereby to cure the impregnating resin and glue the pre-insulated conductors together.

2. The method of producing an electrical coil as defined in claim 1 wherein the facing layers of polycarbonate foil are secured to the inner layer of insulating material by the epoxy resin in its B-state.

3. The method of producing an electrical coil as defined in claim 1 wherein the polycarbonate foil has a thickness ranging between 5 and 15 $\mu$m.

4. The method of producing an electrical coil as defined in claim 1 wherein said mica is in layer form and has a thickness ranging between 50 and 150 $\mu$m.

5. The method of producing an electrical coil as defined in claim 1 wherein the content of the epoxy resin ranges between 25 and 35% of the total weight of the composite insulating tape.

6. The method of producing an electrical coil as defined in claim 1 wherein the composite insulating tape is wound onto the bare conductor material with an overlap factor ranging between 40 to 60%, and preferably amounts to about 50%.

* * * * *